(12) United States Patent
Steinhilper

(10) Patent No.: US 7,398,132 B2
(45) Date of Patent: Jul. 8, 2008

(54) METHOD AND SYSTEM FOR ANALYZING THROUGHPUT

(75) Inventor: Eric A. Steinhilper, Harrison Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 378 days.

(21) Appl. No.: 11/327,121

(22) Filed: Jan. 6, 2006

(65) Prior Publication Data

US 2007/0162163 A1 Jul. 12, 2007

(51) Int. Cl.
- G06F 19/00 (2006.01)
- G06F 11/30 (2006.01)
- G06F 15/00 (2006.01)
- G21C 17/00 (2006.01)

(52) U.S. Cl. ...................... 700/111; 702/185
(58) Field of Classification Search ............. 700/95, 700/108, 111; 702/182, 183, 185; 414/273
See application file for complete search history.

(56) References Cited

U.S. PATENT DOCUMENTS

| | | | |
|---|---|---|---|
| 5,914,879 A * | 6/1999 | Wang et al. | 700/111 |
| 6,341,240 B1 * | 1/2002 | Bermon et al. | 700/97 |
| 6,580,960 B1 * | 6/2003 | Nicholson | 700/121 |
| 6,823,228 B2 * | 11/2004 | Funke et al. | 700/111 |
| 6,829,514 B2 * | 12/2004 | Gyorfi et al. | 700/99 |
| 6,993,403 B1 * | 1/2006 | Dadebo et al. | 700/108 |
| 7,010,377 B2 * | 3/2006 | Gifford et al. | 700/115 |
| 7,065,426 B2 * | 6/2006 | Valentini et al. | 700/111 |
| 7,113,843 B2 * | 9/2006 | Bahlmann et al. | 700/130 |
| 2003/0187535 A1 * | 10/2003 | Liu et al. | 700/108 |
| 2004/0267395 A1 * | 12/2004 | Discenzo et al. | 700/99 |
| 2006/0095232 A1 * | 5/2006 | Purdy | 702/185 |

FOREIGN PATENT DOCUMENTS

JP 2007164580 A * 6/2007

* cited by examiner

*Primary Examiner*—Crystal Barnes-Bullock

(57) ABSTRACT

Described is a method and system for analyzing throughput of a production line. The method includes selecting among the stations, a set of susceptible stations that are affected by at least one selected event, ranking the susceptible stations with respect to a selected event and the predetermined criteria to determine an ordered list of more susceptible stations, altering the selected events to generate a new set of events, reranking the susceptible stations with respect to the selected events comprising the new event to determine a new ordered list of more susceptible stations and determining the most susceptible station based on a comparison criterion of the original ordered list of more susceptible stations and the new ordered list of more susceptible stations.

20 Claims, 4 Drawing Sheets

METHOD AND SYSTEM FOR ANALYZING THROUGHPUT

FIELD OF THE INVENTION

Disclosed is a system and method for analyzing the throughput of a manufacturing line, and more particularly, determining the impact of specific event codes on a manufacturing line.

BACKGROUND OF THE INVENTION

In a large production environment, hundreds of machines or stations may make up a production line. The buffer between stations is a storage area such as a conveyor, transport (i.e. forklift, cart, truck, etc.), silo (either manual or automatic), or simply a place within the flow of product. Every station is configured to generate event codes and transmit event data for analysis. Event codes are generated for many different reasons, for example, when a machine is broken, is starved (no parts are available to process), is blocked (unable to unload a completed part), the machine or station takes to long to complete the manufacturing process and the machine or station requires a tool change.

Production efficiency, throughput, is high when a minimum number of parts are on the line or in a specific buffer such as is required only to maintain continuous flow of products through the manufacturing line at the intended speed. If a station breaks down or becomes inoperable, upstream and downstream stations may be quickly affected. Stations upstream may be blocked if buffers they feed are full. Stations downstream may become starved if buffers they draw from are empty.

A breakdown can occur for a number of different reasons. There may be thousands of possible fault codes associated with a machine. When a breakdown occurs, information about the breakdown is stored in the Production Monitoring and Control (PM&C) system. Commonly this includes a reason for the breakdown (called an event code or a fault code) and the duration. The duration might be further subdivided into a response time, a diagnostic time (time to diagnose the problem), an order time (time to order or acquire the replacement part), and the actual time to repair the machine. Other types of subdivisions for times might be appropriate as well.

The term "breakdown" as used herein may include any number of other conditions of a machine. It truly may be a non-operating machine, or inoperable or become offline. However, it may also be non-functional for many different reasons unrelated to the machine itself. In certain situations, stock may become unavailable. For example, an assembly line that receives components to be mounted on the product (crankshafts and pistons for an engine assembly line) from feeder lines may become slowed if components arrive at a machine late. A shortage of these parts also interrupts production, but this situation should not normally occur on a manufacturing line. Also utilities, such as water, electricity, or compress air may become unavailable.

The categories of reasons for a machine not producing parts may vary from line to line and for different types of lines. A manufacturing line has frequent tool changes that cause the interruption of production but which do not normal occur on an assembly line. Other words, including "down" or "downed" may be jargon for any type of inoperability. As used herein, any of the terms or others discussed above are interchangeable. The flow or progress of a line, its throughput, is impacted whether a machine is inoperable, ceases to function or is waiting for parts.

A production facility may have a communications network connecting the stations to a centralized unit. Sensor for determining a station's status and sensors for determining the flow or progress of product making its way through a line may be connected to the centralized unit by wires or they may be wireless. Machine controller may also be connected to the centralized unit. An error or fault code may be generated by sensors or controllers and sent to the centralized unit when a station breaks down or stops operating for any reason. The fault code identifies the reason for the stoppage so that when the fault code and time stamp are available, the time and reason of the breakdown may be determined. A supervisor may be alerted by the centralized unit when a station has stopped operating. Maintenance personnel may be alerted to attend to the downed station. If adjacent buffers become full or empty, other stations may also stop operating. Once a station that has had a breakdown becomes again operational, the line will thereafter start up again. The starved stations will begin receiving product and the blocked stations will be able to process product. However, some stations may be slow to recover after such a problem or fault occurrence.

When all the breakdown data are available, the average duration or MTTR (mean time to repair) and the MCBF (mean count between faults) or MTBF (mean time between faults) and other useful measures can be calculated. Sometimes a curve fit to an analytical function is made. Other times the analytical function is assumed to be a negative exponential.

SUMMARY

Disclosed is a throughput analysis method and system for a manufacturing line including a plurality of machines, each configured to generate event codes which are input to the throughput analysis. The event codes are used to calculate MTTR and MCBF, and these values are input to the throughput analysis. Described herein is a method and system to determine changes which would occur to the MTTR and MCBF if specific faults became less frequent or were eliminated or if the repair time were reduced. The throughput analysis method includes calculating a first throughput value for the plurality of machines based on the input, ranking the plurality of machines and their associated event codes according to their effect on throughput, altering a value of a first event code associated with a first machine to generate an altered first event code for a new event code input, recalculating a second throughput value based on the new event code input, and comparing the first throughput value with the second throughput value to generate a weight of the first event code on the first throughput value.

DETAILED DESCRIPTION OF THE INVENTION

Oftentimes production monitoring and control will identify a list of the top five or ten stations that have failed. These may be listed in order of duration of failures or frequency of failures and may be discoverable in a curve fitting analysis, for example. In the data however, there may be found other stations, not in the top five or ten stations whose reliability could be improved at a lower cost, for example, to provide a higher throughput. The method and system described herein may determine those fault codes with respect to particular stations that have an impact on throughput, not otherwise part of the top five or ten stations that have failed. Analyzing throughput in the manner described herein may identify stations and event codes not previously thought to substantially impact production.

Described is a method and system for evaluating stations of a system for improvability according to predetermined criteria. The method that will be described in more detail below includes selecting among the stations, a set of susceptible stations that are affected by at least one selected event, ranking the susceptible stations with respect to a selected event and the predetermined criteria to determine an ordered list of more susceptible stations, altering the selected events to generate a new set of events, reranking the susceptible stations with respect to the selected events comprising the new event to determine a new ordered list of more susceptible stations and determining the most susceptible station based on a comparison criterion of the original ordered list of more susceptible stations and the new ordered list of more susceptible stations.

This invention may be embodied in the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 1:
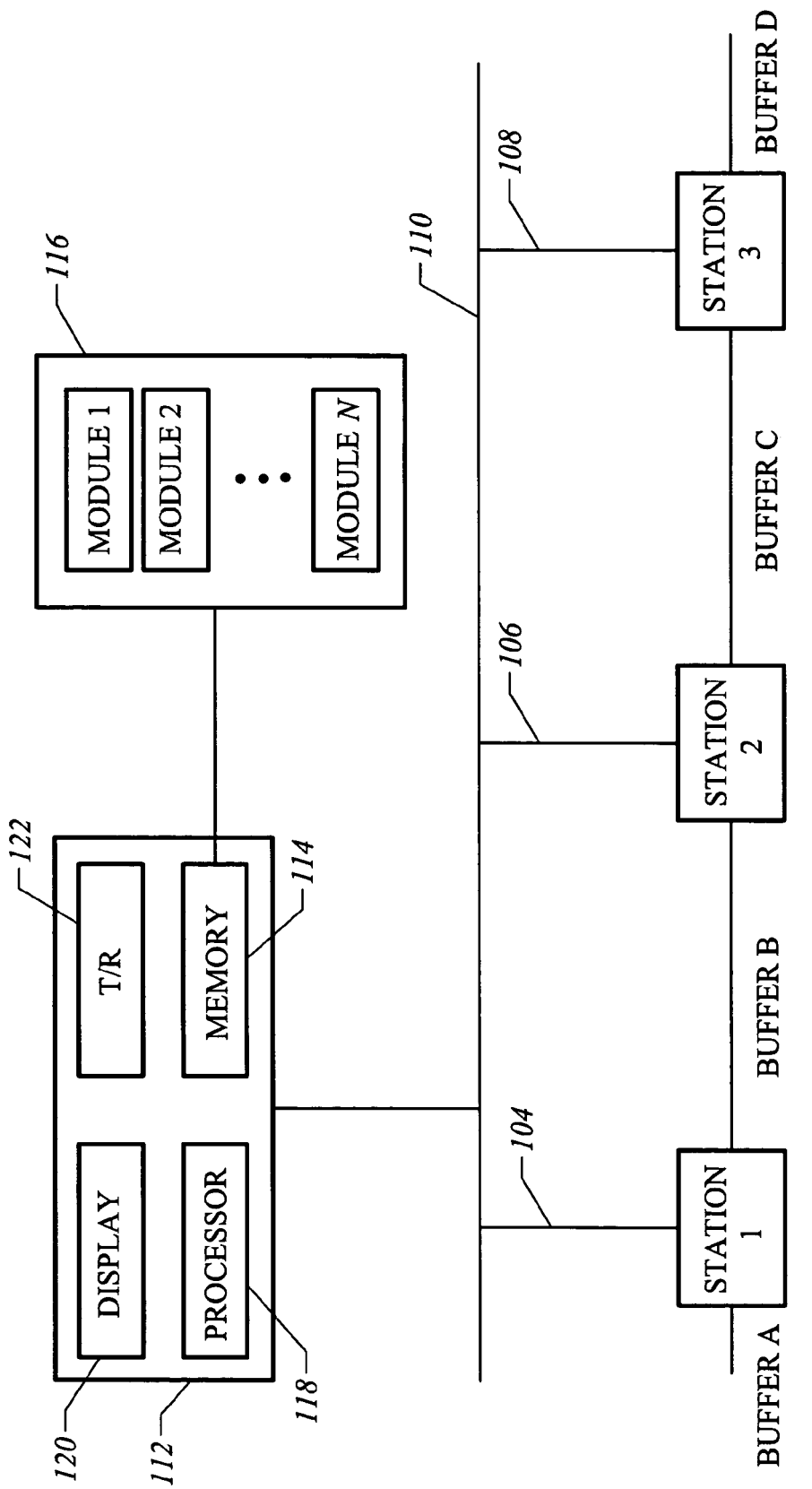
FIG. 1 is a system diagram showing certain elements of the manufacturing line in communication with a central computational apparatus.

FIG. 1 is a system diagram showing certain elements of the manufacturing line in communication with a central computational apparatus. The line 102 includes Stations 1, 2 and 3, and buffers A, B, C and D. Respectively, Stations 1, 2 and 3 having communication 104, 106 and 108 with the central system 110 that is in communication with the central communication apparatus 112. While the central apparatus 112 is depicted in communication with the line 102, the data of course may be input to one or more remote units via one or more communication networks. Buffers A, B, C and D may also be in communication with the central system 110 and 112 as well, either individually or through the Stations 1, 2, and 3 even though this is not shown on the figure.

Communication networks such as 110 including communication lines 104, 106 and 108 are used to transmit digital or analog data both through land lines and through radio frequency links, and satellite links. Examples of communication networks are cellular telephone networks, messaging networks, and Internet networks.

The central apparatus includes a memory 114 can store the input event code data and can also include instructions modules 116. The central apparatus further may include a processor 118 for processing instructions and data. Output from the throughput analysis is provided to an output device such as a display 120 or is transmitted via transmitter/receiver (T/R) 122. Output is provided in any suitable manner.

The calculations performed at the central apparatus weigh the effect of an individual event code on production by determining how it affects throughput. For clarity, the predetermined criterion is described as throughput in this embodiment; other criteria might be used as well. Substantial data is provided as input. A specific fault is selected for analysis. Once a specific fault has been selected, a modified MTTR and MCBF can be calculated from the repair times and number of incidences (using the procedure on the most frequently occurring faults or longest duration faults may represent a special case). The throughput value under these conditions is determined, for example, with the discrete event simulation of the production line. Sorting the throughput for the combinations under consideration can give the impact of the events on production so that maintenance planners can prioritize the sequence of machine repairs.

Figure 2:
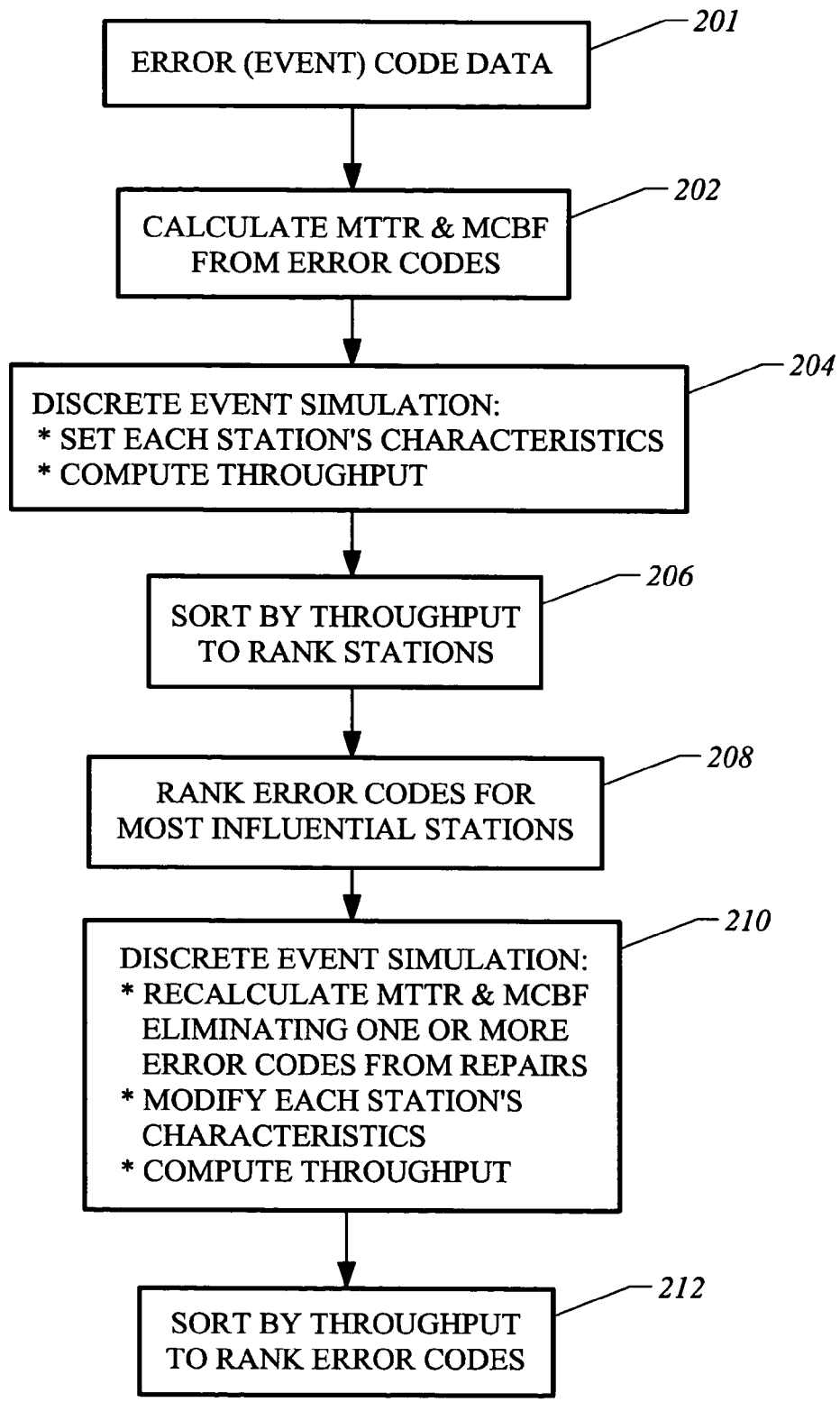
FIG. 2 is a flow chart illustrating the method as described herein.

Generally, the process is shown in FIG. 2 which is a flow chart illustrating a number of steps of the method. A database of event codes 201 is established on a machine-by-machine basis, and MTTRs and MCBFs are calculated for each machine that is under consideration 202. The calculation can occur in building, for example, a discrete event simulation 204 of a line based in production data. It will be understood that other types of decision-making tools may be used as well. The stations for which improvements to MTTR and MCBF will have the most significant effect on throughput are identified. In principle, this may be done for every station by making a ten percent improvement in repairs. The results are sorted on throughput in descending order 206. The stations which showed the biggest improvement in throughput are the ones on which the efforts should be concentrated 208.

In step 210, the MTTRs and MCBFs are modified. The duration of the selected faults (commonly the most frequently or most significant fault codes) is determined from the database on a machine-by-machine basis. The greatest importance can be given to those stations identified in the previous step. Then in step 210 MTTRs and MCBFs are recalculated eliminating (or reducing) the repair times and interruptions for one or more event codes as shown in the equation (see below). That is, the event code k is removed from MTTR and MCBF data according to the following formula:

$$MTTR_{revised} = \frac{\sum \text{repair times} - \sum \text{repair times (fault } code_k)}{\sum \text{repairs} - \sum \text{repairs (fault } code_k)}$$

where the original MTTR was calculated from the entire list of fault codes and durations as:

$$MTTR_{original} = \frac{\sum \text{all repair times}}{\sum \text{all repairs}}$$

that is, the discrete event simulation is rerun 210, once for each proposed change. More than one change may be made prior to a discrete event simulation as well.

The ranking then begins 212. To weigh the importance of an individual fault code k for some arbitrary station, two runs of the discrete event simulation are needed. First the baseline is run 204, and then there is a run with that particular fault code removed from the MTTR and MCBF values 210. The "importance" or weight, then, is the difference in throughput for the two runs. The term importance is another term for weight, and should be considered in that light in accordance with this discussion. In this example, "importance" or the predetermined criteria means throughput. The ranking may also be done based on other quantities, for example, the cost of making the adjustments which eliminate the fault codes, the cost effectiveness (cost per unit of throughput improvement), or the amount of time (production) lost making the adjustments. This list is not intended to be exhaustive; many such measures of value are known to the plants and are tracked by their monitoring systems.

Alternatively, the consequences of improving the maintenance at a station may involve reducing the production lost because of several faults, k, l, m, & n. This can be evaluated as well by following the same procedure but using all the appropriate fault codes and their occurrences. As before, in this type of calculation, each individual vault may be eliminated or reduced by some percentage Running the discrete event simulation with the revised MTTR 210, as shown in the equation, provides the upper bound on throughput if the repair were totally eliminated, meaning the cause of the failure is removed and the machine never again has this failure. If the response times of the maintenance crew to the occurrence of breakdowns (fault codes) can be determined from data collected by monitoring systems, other hypothetical (intermediate in effect) scenarios can be created for evaluation, such as: the same number of faults and repair time, but a faster response; some fraction of the faults, but the same repair time; same number of faults, but a faster repair time. For these cases, it may be necessary to modify MCBF as well as MTTR.

Several embodiments are disclosed herein and include (but are not limited to): 1) recalculating MTTR and MCBF after eliminating a single fault code on a single machine, 2) recalculating MTTR and MCBF after eliminating a single fault code on two or more machines (multiple machines), 3) recalculating MTTR and MCBF after eliminating a single fault code on one machine and reducing the consequences of that fault code on a second machine, 4) recalculating MTTR and MCBF after eliminating a single fault code on one machine and a different fault code on a second machine. Many, many such combinations are possible involving single faults, multiple faults, single machines, multiple (two or more) machines, elimination of one or more faults, and reducing the consequences of one or more faults. In all of these embodiments it is understood that after the revised MTTR's and MCBF's have been calculated that the throughput or other predetermined criteria is re-evaluated with the computer program code and a determination of the consequences of the changes is made.

In another embodiment the analysis may be extended to multiple machines, some or all of which might optionally have certain specific error codes eliminated or their effects reduced for the computation of MCBF and MTTR. Some repairs, such as repairs to the utilities, might affect groups of machines. Certain types of repairs or adjustments may be carried out on similar machines in the same line. Either of these situations would require an analysis that covers multiple machines. Furthermore, it may be very expensive (in terms of maintenance effort, cost, or lost production time) to eliminate all breakdowns of a certain type. Frequently, the last few are much harder to eliminate than the first. Such a situation requires that an analysis works on a fault code with a reduced impact as well as a fault code which has been eliminated.

Returning to a discussion of steps 202 and 204, this embodiment includes the case where a change in the performance of more than one machine by altering (determining the consequences of eliminating/reducing) one or more types of failure (event code) for certain machines. The procedure which stems from this embodiment or implementation can determine the effectiveness on throughput of correcting breakdowns so that the improvements can be ranked.

Varying the effects of breakdowns on multiple machines may be accomplished in any suitable manner. As an example, a change in the performance of a manufacturing line might be made with two machines (machines 3 and 7) being improved in the following manner:

TABLE 1

Proposed Improvements to Production Line Operation

| Machine 3 | Failure mode 1 | eliminated |
|---|---|---|
|  | Failure mode 2 | reduced 25% |
|  | Failure mode 3 | eliminated |
|  | Failure mode 4 | no change |
| Machine 7 | Failure mode 1 | no change |
|  | Failure mode 2 | eliminated |
|  | Failure mode 4 | reduced 50% |
|  | Failure mode 5 | reduced 10% |
| Machine 8 | Failure mode 1 | no change |
|  | Failure mode 5 | no change |
|  | Failure mode 6 | no change |

For purposes of this example, only six failure modes are listed, and the same six modes could occur for all eight machines in the production line. Furthermore, as a result of adjustments made to Machine 7, failure mode 4 has the same number of failures but can be repaired in 50% less time; failure mode 5 has the same repair time per incident but the number of incidents is 10% less. Numerical values relating to the failures and repairs are listed in Table 2 in order to illustrate the calculation procedure. Moreover, for purposes of this example, these failures and repairs were encountered during the manufacture of 1000 parts.

TABLE 2

Numerical Example of Improvements to Production Line Operation

| | | Original Operation | | Improved Operation | |
|---|---|---|---|---|---|
| Machine | Failure Mode | Total Repair Time | Number of Incidents | Total Repair Time | Number of Incidents |
| Machine 1 | 1 | 350 sec | 8 | 0 sec | 0 |
| Machine 1 | 2 | 160 sec | 4 | 120 sec | 3 |
| Machine 1 | 3 | 315 sec | 6 | 0 sec | 0 |
| Machine 1 | 4 | 200 sec | 7 | 200 sec | 7 |
| Machine 7 | 1 | 350 sec | 7 | 350 sec | 7 |
| Machine 7 | 2 | 325 sec | 6 | 0 sec | 0 |
| Machine 7 | 4 | 240 sec | 4 | 120 sec | 4 |
| Machine 7 | 5 | 300 sec | 10 | 270 sec | 9 |

The original MTTR for Machine 1 is:

$$MTTR_{Machine\ 1} = (350+160+315+200)/(8+4+6+7) = 1025/25 = 41\ sec$$

The MTTR for Machine 1 after the performance of the machine is altered becomes:

$$MTTR_{Machine\ 1}=(120+200)/(3+7)=320/10=32\ \text{sec}$$

The original MCBF for Machine 1 is:

$$MCBF_{Machine\ 1}=1000/(8+4+6+7)=1000/25=40.0$$

The MCBF for Machine 1 after the performance of the machine is altered becomes:

$$MCBF_{Machine\ 1}=1000/(3+7)=1000/10=100.0$$

The original MTTR for Machine 7 is:

$$MTTR_{Machine\ 7}=(350+325+240+300)/(7+6+4+10)=\\1215/27=45\ \text{sec}$$

The altered MTTR for Machine 7 is:

$$MTTR_{Machine\ 8}=(350+120+270)/(7+4+9)=740/20=37\ \text{sec}$$

The original MCBF for Machine 7 is:

$$MCBF_{Machine\ 7}=1000/27=37.0$$

The altered MCBF for Machine 7 is:

$$MCBF_{Machine\ 7}=1000/20=50.0$$

Figure 3:
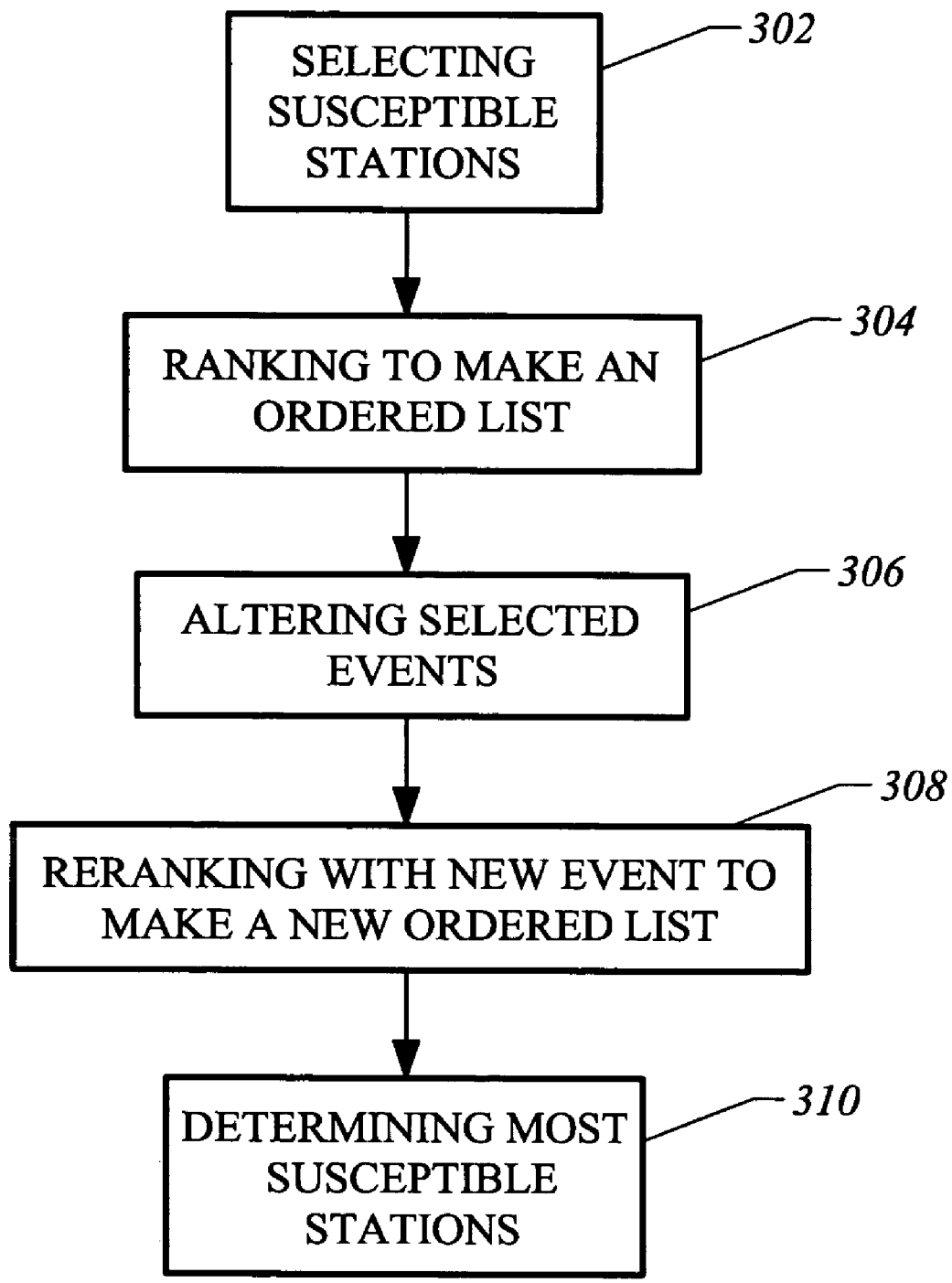
FIG. 3 is a flowchart shows steps for carrying out the method as described with reference to FIG. 2.

Turning to FIG. 3 which shows certain other steps for carrying out the method as described with reference to FIG. 2. The method for evaluating stations of a system for improvability according to predetermined criteria includes selecting among the stations, a set of susceptible stations that are affected by at least one selected event 302. The event may be one of the more common faults, but it may also be selected, for example according to cost, difficulty, time to fix, or time the line would be inactive. The susceptible stations are ranked with respect to a selected event and the predetermined criteria to determine an ordered list of more susceptible stations. The ranking may come from common knowledge, including the identification of a few stations that are the most sensitive to improvements in MTTR or MCBF, or the most affected by improvements to MTTR and/or MCBF. The ranking may further be with respect to, for example, cost, maintenance priorities, production throughput. As described above with respect to the equations, the method includes altering the selected events to generate a new set of events 306 and then reranking the susceptible stations with respect to the selected events including the new event to determine a new ordered list of more susceptible or more affected stations. The most susceptible station is found based on a comparison criterion of the original ordered list of more susceptible stations and the new ordered list of more susceptible stations 310.

Figure 4:
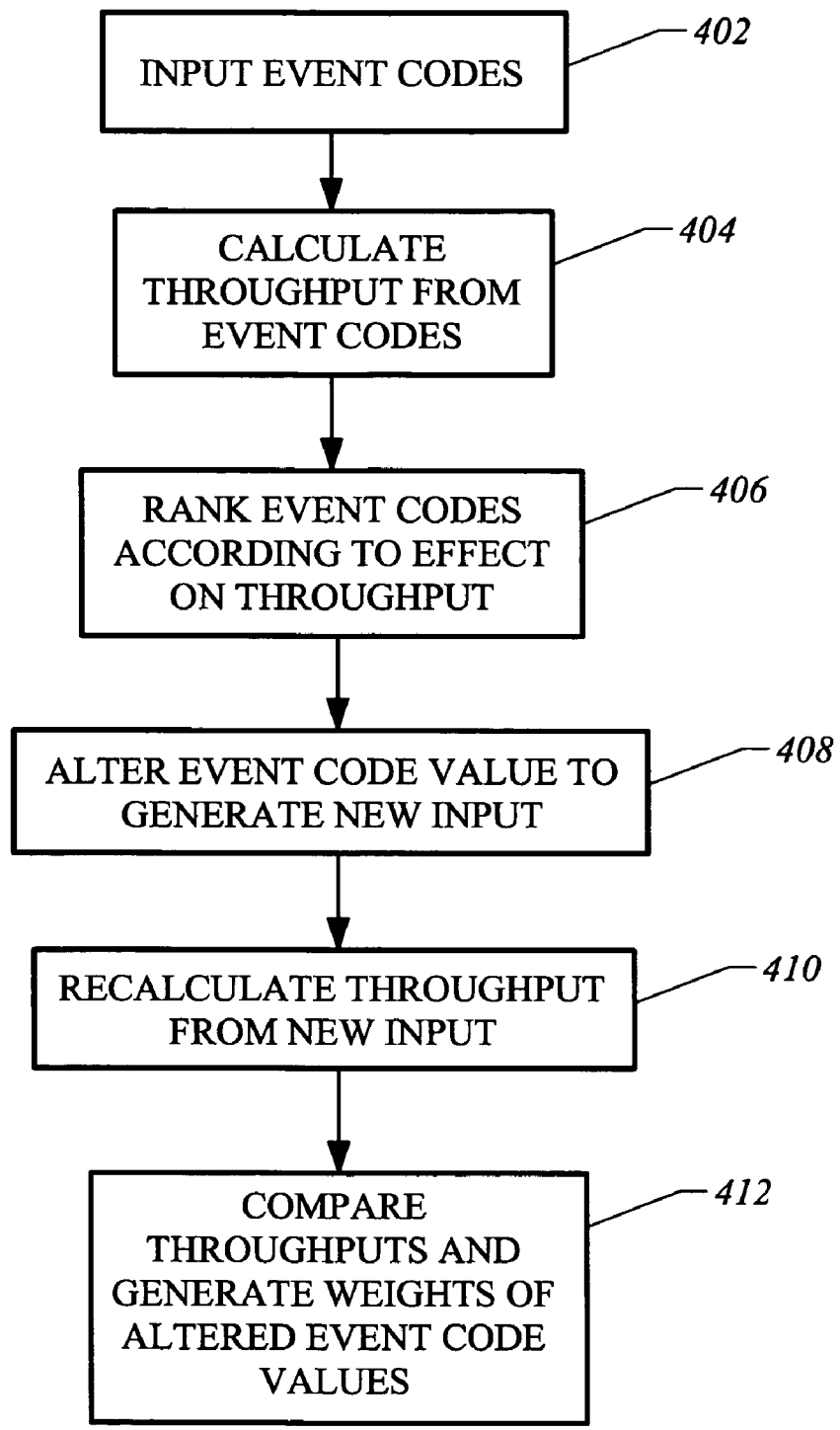
FIG. 4 is a flowchart showing certain other steps for carrying out the method as described with reference to FIG. 2.

FIG. 4 which shows certain other steps for carrying out the method as described with reference to FIG. 2. A throughput analysis method for a manufacturing line, which could be for the manufacture of, for example, motorized vehicles. The line as discussed above includes a plurality of machines (see FIG. 1), each configured to generate event codes which are input to the central apparatus for throughput analysis 402. The throughput analysis method and a system of instruction modules provides for calculating a first throughput value for the plurality of machines based on the input 404. The method and instruction modules provides for ranking the plurality of machines and their associated event codes according to their effect on throughput 406. The method and instruction modules further provide for altering a value of a first event code associated with a first machine to generate an altered first event code for a new event code input 408. The method and instruction modules further provide for recalculating a second throughput value based on the new event code input 410 and comparing the first throughput value with the second throughput value to generate a weight of the first event code on the first throughput value 412.

Additionally, a sensitivity analysis is performed using a discrete event simulation to identify the stations for which an improvement in MTTR and/or MCBF would product the largest increase in throughput. Sensitivity can be defined as the percent change in throughput for a percent change in repair time.

The method for determining sensitivity (that is, the process in going from 204 to 206 or from 404 to 406) includes comparing the first throughput value with the second throughput value to generate a percentage difference in throughput, comparing the difference between the first event code having a repair time and the altered first event code having a repair time to generate the percentage difference in repair time, and dividing the percentage difference in throughput by the percentage difference in repair time to generate the sensitivity.

In one calculation for example with 100 stations, the sensitivities for the certain stations can be determined. For purposes of shortening the calculations, MTTR is decreased 5% for a single station at the same time that MCBF is increased 5%, giving a 10% decrease in repair time. One throughput calculation is then made for each possible configuration which has had the values changed for one station while the other 99 remain unchanged. Since the sensitivity is defined as the percentage difference in throughput divided by the percentage difference in repair time, the same procedure is repeated for a 10% increase in repair time, and the average sensitivity is determined by averaging the sensitivities to a repair time decrease and increase.

The disclosed method and system may identify stations for which proposed improvements will have no influence on productivity. By eliminating effort (resources—financial and personnel) wasted on improvements which do not improve throughput, resources may be used more effectively.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A throughput analysis method for a manufacturing line including a plurality of machines, each configured to generate event codes which are input to the throughput analysis, the throughput analysis method comprising:

calculating a first throughput value for the plurality of machines based on the input;

ranking the plurality of machines and their associated event codes according to their effect on throughput;

altering a value of a first event code associated with a first machine to generate an altered first event code for a new event code input;

recalculating a second throughput value based on the new event code input; and comparing the first throughput value with the second throughput value to generate a weight of the first event code on the first throughput value.

2. A method as recited in claim 1 wherein input for the calculating step is derived from:

calculating with a mathematical algorithm the mean time to repair for the plurality of machines and from that calculating repair times for the different codes representing breakdowns; and calculating with a mathematical algorithm mean count between events for the plurality of machines and from that calculating the mean time between failures and mean count between failures.

3. A method as recited in claim 1 wherein calculating a first throughput value, comprises:

processing by a discrete event simulation.

4. A method as recited in claim 1 wherein the recalculating step comprises:

recalculating with a mathematical algorithm from the mean time to repair for the plurality of machines a new set of event codes and their corresponding repair times; and recalculating with a mathematical algorithm from the mean count between events for the plurality of machines a new set of event codes and the corresponding number of parts made between events.

5. A method as recited in claim 4 wherein recalculating with the mathematical algorithm, comprises:

processing by a discrete event simulation.

6. A method as recited in claim 1 further comprising determining sensitivity, the method further comprising:

comparing the first throughput value with the second throughput value to generate a percentage difference in throughput;

comparing the difference between the first event code having a repair time and the altered first event code having a repair time to generate the percentage difference in repair time; and dividing the percentage difference in throughput by the percentage difference in repair time to generate the sensitivity.

7. A method as recited in claim 1 wherein altering a value of a first event code comprises:

changing a repair time of the first event code.

8. A method as recited in claim 1 wherein altering a value of a first event code comprises:

eliminating the first event code.

9. A method as recited in claim 1 wherein altering a value of a first one event code to generate an altered event code further comprises:

altering a plurality of event codes values to generate a plurality of altered event code values.

10. A method for evaluating stations of a system for improvability according to predetermined criteria, the method comprising;

selecting among the stations, a set of susceptible stations that are affected by at least one selected event;

ranking the susceptible stations with respect to a selected event and the predetermined criteria to determine an ordered list of more susceptible stations;

altering the selected events to generate a new set of events;

reranking the susceptible stations with respect to the selected events comprising the new event to determine a new ordered list of more susceptible stations; and determining the most susceptible station based on a comparison criterion of the original ordered list of more susceptible stations and the new ordered list of more susceptible stations.

11. A method as recited in claim 10 wherein determining comprises evaluating with a decision-making tool.

12. The method of claim 11, wherein the decision-making tool comprises a discrete event simulation.

13. The method of claim 10, wherein the comparison criterion comprises cost.

14. The method of claim 10, wherein the comparison criterion comprise maintenance priorities.

15. The method of claim 10, wherein the comparison criterion comprises production throughput.

16. The method of claim 10 wherein a station comprises at least one manufacturing machine.

17. A manufacturing line system comprising a plurality of machines configured to generate event codes as input, the input delivered to a computational subsystem, the system comprising:

a calculating module for calculating a first throughput value for the plurality of machines based on the event code input;

a ranking module for ranking the plurality of machines and their associated the event codes according to their effect on throughput;

an altering module for altering a value of a first event code to generate an altered first event code to generate new event code input;

a recalculating module for recalculating the second throughput value based on the new event code input; and a comparing module for comparing the first throughput value with the second throughput value to generate an influence value for the altered event code inputs on the first throughput value.

18. A system as recited in claim 17 wherein the calculating module comprises:

a discrete event simulation module.

19. A manufacturing line system as recited in claim 18 wherein the manufacturing line is for the manufacture of motorized vehicles.

20. A system as recited in claim 17 wherein the comparing module comprises:

a decision-making tool module.

* * * * *